(12) United States Patent
Geletka

(10) Patent No.: US 8,497,589 B2
(45) Date of Patent: Jul. 30, 2013

(54) ELECTRICITY PRODUCTION FROM STATIC WEIGHT

(76) Inventor: John Richard Geletka, Royal Oak, MI (US)

( * ) Notice: Subject to any disclaimer, the term of this patent is extended or adjusted under 35 U.S.C. 154(b) by 814 days.

(21) Appl. No.: 12/590,603

(22) Filed: Nov. 10, 2009

(65) Prior Publication Data
US 2010/0117374 A1    May 13, 2010

Related U.S. Application Data

(60) Provisional application No. 61/198,831, filed on Nov. 10, 2008, provisional application No. 61/198,847, filed on Nov. 10, 2008.

(51) Int. Cl.
*H02K 39/00*    (2006.01)

(52) U.S. Cl.
USPC ............................................. 290/1 R; 60/325

(58) Field of Classification Search
USPC ............................. 290/1 R, 1 A, 4 R; 60/325
See application file for complete search history.

(56) References Cited

U.S. PATENT DOCUMENTS

| | | | |
|---|---|---|---|
| 4,238,687 A | 12/1980 | Martinez | |
| 4,239,974 A | 12/1980 | Swander et al. | |
| 4,239,975 A | 12/1980 | Chiappetti | |
| 4,250,395 A | 2/1981 | Lundgren | |
| 4,339,920 A | 7/1982 | Le Van | |
| 4,739,179 A | 4/1988 | Stites | |
| 4,980,572 A | 12/1990 | Sen | |
| 5,157,922 A * | 10/1992 | Baruch | 60/325 |
| 5,347,186 A * | 9/1994 | Konotchick | 310/17 |
| 5,355,674 A | 10/1994 | Rosenberg | |
| 5,634,774 A * | 6/1997 | Angel et al. | 417/229 |
| 6,091,159 A | 7/2000 | Galich | |
| 6,172,426 B1 | 1/2001 | Galich | |
| 6,204,568 B1 | 3/2001 | Runner | |
| 6,376,925 B1 | 4/2002 | Galich | |
| 6,767,161 B1 | 7/2004 | Calvo | |
| 6,858,952 B2 | 2/2005 | Gott et al. | |
| 7,067,932 B1 | 6/2006 | Ghassemi | |
| 7,102,244 B2 | 9/2006 | Hunter | |
| 7,145,257 B2 | 12/2006 | Ricketts | |
| 7,432,607 B2 * | 10/2008 | Kim et al. | 290/1 R |

* cited by examiner

*Primary Examiner* — Nicholas Ponomarenko

(57) ABSTRACT

The invention relates to an electric energy generation system based on the use of static weight. The static weight can be placed, pushed, or rolled onto a platform or shelf, controlled in its vertical motion downward, and connected to an electric generator, which transforms the vertical linear motion to electricity. A gearing system, hydraulic transmission, fluid coupling, or torque convertor to convert linear to rotational motion is employed as necessary, thereby turning the generator. A return means, of various forms, allows the platform or shelf to return to original position, and provides an opportunity to make use of vertical motion once again for energy production. A flywheel may be used to provide more sustained and smoother power over a longer period, and other amplification means may be used to increase duration or amount of power, as well as conversion means to provide electricity in usable form.

12 Claims, 2 Drawing Sheets

ELECTRICITY PRODUCTION FROM STATIC WEIGHT

RELATED U.S. APPLICATION DATA

Provisional application Nos. 61/198,831 and 61/198,847, both filed on Nov. 10, 2008.

FIELD OF THE INVENTION

The production of usable electrical energy from the use of static weight.

BACKGROUND OF THE INVENTION

Production of electricity has been important for over the last hundred years. Many methods now exist to do this. Those involving combustion or heat to turn turbines require energy sources. Wind turbines can create electricity, though they may not do it in a planned or consistent manner. Water movement can do this, but requires sometimes, due to geography, long distance electrical transmission to where it the power is needed. Solar energy does not depend on a generator, but cannot produce electricity when the sun is not available. The present invention allows energy to be produced when planned and wherever desired, even in remote areas.

There have been numerous ideas involving usage of everyday human actions to create electrical energy, such as electrical energy from the movement of pedestrians or vehicles to provide electricity for the immediate product or mechanism, or light a display, or ring a bell. Its been suggested that the movement of clothes, through piezo electronics or transducers, can power a personal telephone device. Up until now, there has not been a proposed invention making use of static weight for the production of a sizeable amount of electricity.

Some past inventions have explored the idea of using the weight of moving vehicles, such as trains or automobiles, on a track or roadway, to create pressure to turn a generator shaft, but have never found practical or financial success. Shortcomings of such devices are apparent upon analysis, since the downward component of force is only a fraction of the forward momentum in each case.

Some related inventions to date are offered for example. The ones involving use of vehicle, such as rail, or pedestrian traffic to produce downward pressure are shown to have minimal effectiveness. Numerous roadway related inventions are shown, for example, in U.S. Pat. Nos. 4,239,975; 4,739,179; 4,980,572; 6,091,159; 7,067,932; and 7,102,244. In most of these cases, there is a certain amount of force presented downward, but it is only a fraction of the force going forward at all times, especially at a highway speed of 60 MPH. There have been inventions involving slower human actions of stepping upon, as in U.S. Pat. Nos. 4,250,395 and 7,432,607. Many have been inventions that use momentary downward force to produce energy for the immediate product or mechanism in usage, for signaling or illumination purposes. To date there has not been an invention, or means of teaching, to make efficient and sizeable use of downward force from stationary objects in the production of electricity exportable for usage in facilities or charging of batteries.

The present invention teaches ways to create significant amounts of electrical power by making total use of the downward pressure of a static weight, for any time between a few seconds and one day or more, before (re)moving of the static weight. Additional optional electrical energy multiplier devices such as transformers, or mechanical multiplier devices such as staged release methods for timed descent, can be used to enlarge or extend the amount of electricity created. Reciprocal vertical movement means can double the energy produced from static weight as the weight is removed. Sufficient energy can be created to power facilities or recharge batteries.

While examining the previous inventions for elements which may be related, we see that the present invention has no direct relation to the previous inventions, and nor do any other inventions from the past or present relate to usage in the way the present invention does. While this present invention has many benefits to offer, it is not so much an improvement over current technologies as much as an expansion into a new field.

Stationary weight is around us every day. It may certainly be found in warehouses, parking lots, industrial companies, and overnight truck stops. The intention of the present invention is to make use of this potential energy for utility, commercial and residential purposes.

SUMMARY OF THE INVENTION

There are numerous possibilities for the production of electricity from static weight for use within facilities, stored in batteries, or exported out to the power grid. A warehouse operation may move pallets of goods, or a factory may move parts bins from one location to another where they may stay for a few hours or a day. Semi-trucks may park for the night at a truck stop. A passenger vehicle may pull into a garage or parking space, and out again after some time.

The present invention uses static weight in the generation of electricity. The invention in all cases has a weight holding component, whether a platform, shelf, rack, hook, vessel, or other as means of holding the object of static weight, with a vertical connection means, to an electric generator, thereby allowing the static weight of an object, utilizing gravitational force, to generate electricity. The vertical component of force is used to provide sufficient force to an electrical generator, assisted as necessary through gearing or other transmission means into rotational means, thereby supplying energy to be received by a rotational electrical generator.

The invention has a return means (springs, gas-filled cylinders, hydraulic devices, counterweights, etc.) to reposition the weight holding component to the original position, allowing the vertical connection means and any connected gearing/transmission means to supply energy also from the movement upward, once again engaging and utilizing the generator in producing electricity.

A clutch system can be employed to allow any rotational means to remain turning even after the vertical connection means has ended its path. A flywheel can be employed to retain motional energy. The flywheel and generator may be combined into a single unit.

Descent of the weight holding component and vertical connection means downward may be controlled, and staged, through the use of spaced solenoids or other means, so as to provide controlled and consistent electrical energy, and on ascent upward as well once the static weight has been removed, thereby doubling the effective/potential production of electricity.

Controlling devices may be incorporated so as to provide usable energy for battery charging applications, continuous feed into commercial or residential electrical systems, or sent out onto the electric power grid system.

Transmission or conversion devices may be integrated to increase, or step-up, the amount of energy produced mechanically. As well, other electrical step-up transformers or force multipliers may be used to maximize the energy created.

As well, numerous storage means, of various efficiencies, including chemical battery, capacitor, or energy conversion means may be employed to profitably retain the energy produced, for either immediate or subsequent usage.

Additional conversion and control means may be employed to ensure output matches desired applications (ie. AC, DC, amount, timing, etc.).

DETAILED DESCRIPTION OF THE DRAWINGS

Figure 1:
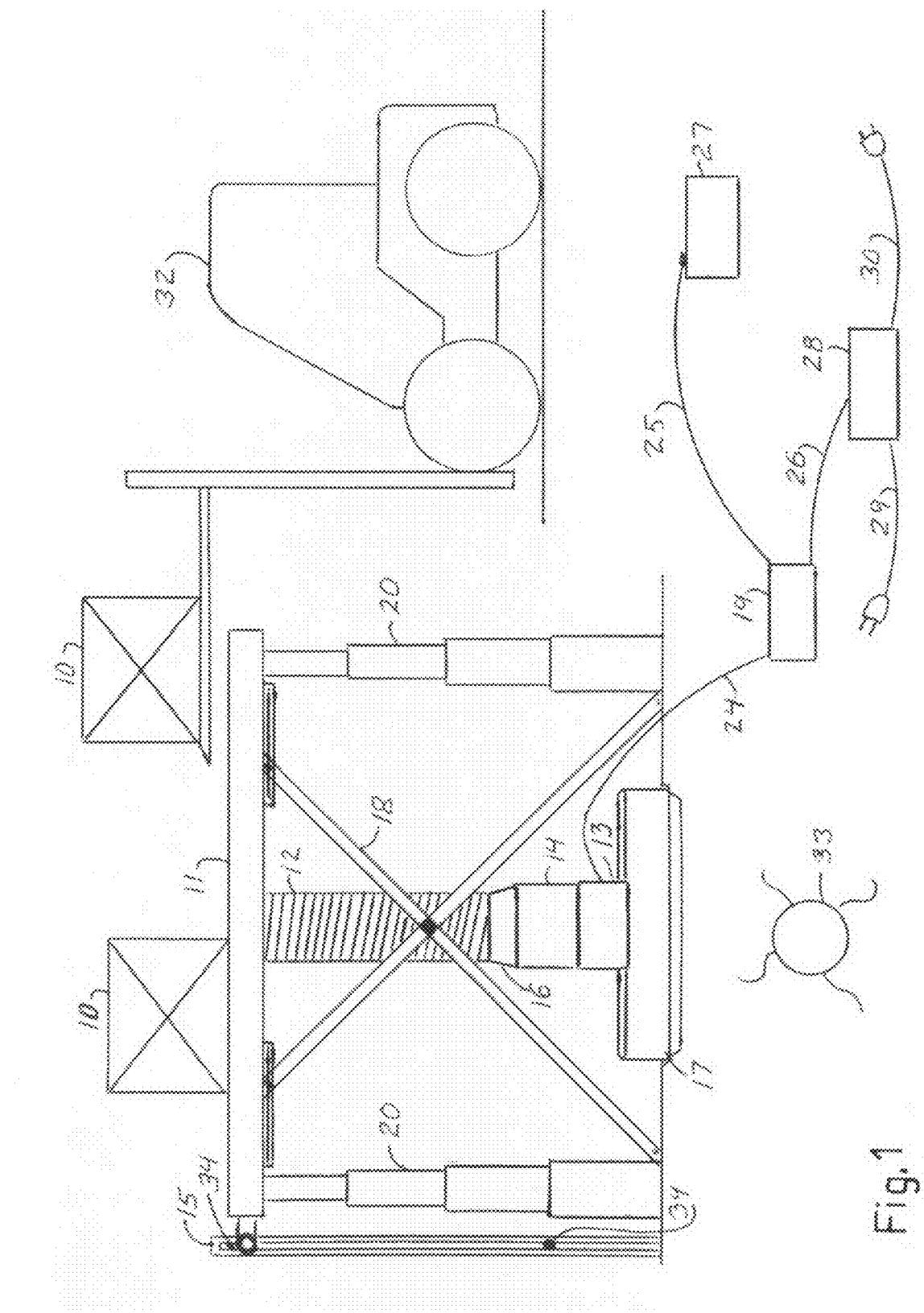
FIG. 1 is a side view illustration of the one version of the invention and its usage.

In FIG. 1, the stationary weight (10) is placed upon the weight holding component (11), thereby applying force on vertical connection means (12) to the generator (13), accommodated in this case by convertor/transmission (14). While generator (13) may be of another type, it is presented here as the rotational type, thereby necessitating convertor/transmission (14), which changes linear to rotational motion through the use of a screw-type mechanism, though it very well could have been toothed or beveled gears, torque convertor, hydraulic or pneumatic transmission, cables, or belts.

Clutch means (16) allows rotational motion here to continue even as vertical motion may pause or stop by way of disengaging the vertical connection means (12) from any rotational motion Return means (20) allows upward motion, here portrayed as gas struts, although it could be springs, counterweights, hydraulic or pneumatic means, returning the weight holding component (11) to its original vertical position once the static weight is removed. Connection thus through vertical connection means (12) with transmission (14) and generator (19) allows force to then be applied again and producing electricity once again.

A flywheel means (17) allows additional rotational power and extension of time for electrical power generation. A clutch type mechanism may also be employed here.

A descent/ascent regulator (18) controls movement downward and upward, either smoothly or staged, here by incorporation of solenoids, thereby allowing the generator to run for a longer period. The mechanical control/guidance system (15) allows for a smooth controlled vertical path for the weight holding component and incorporates a locking device (34) here as a pair of solenoids, to stop any vertical movement at the top and bottom of travel. This locking device is to restrict unintended movement and make loading and unloading of the stationary weight (10) safe.

Electrical energy output connector (24) allows electricity generated to be sent to a step-up transformer (19). Output connector (25) provides electricity energy to a battery (27), capacitor, or other storage system. Output connector (26) provides electricity to AC/DC convertor (28). Power may then be sent out via connector (29) to be used within the facilities, or exported via connector (30) to the power grid. An overall logic control system (33) with sensors connected to the various components of the invention may be employed to as to allow communication between them, and provide for the overall efficiency of the system.

Figure 2:
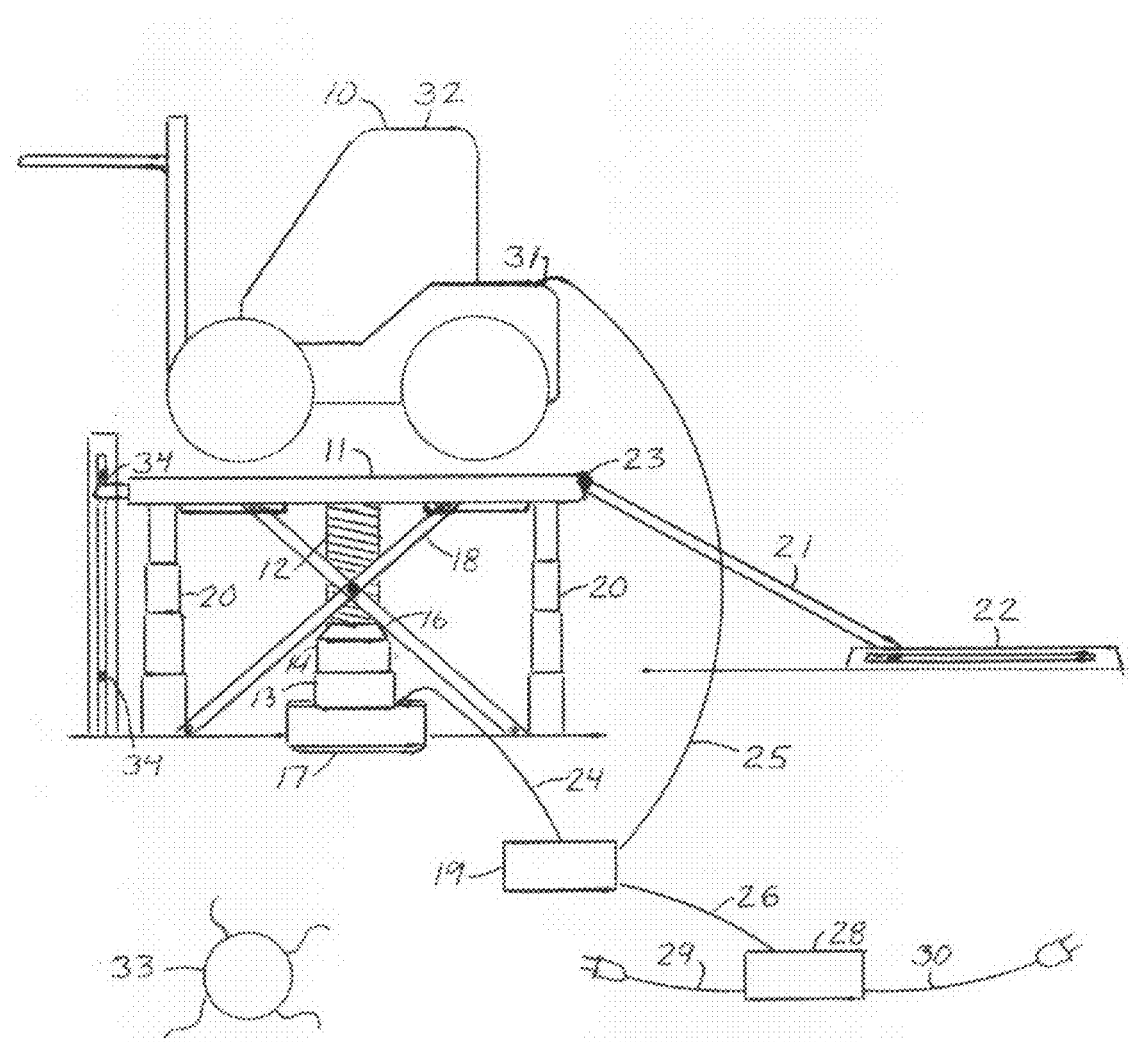
FIG. 2 is a side view of the invention, with ramp, in another usage.

FIG. 2 shows the source of the stationary weight to be the forklift (32) itself, and the mechanics involved with a ramp (21), allowing a static weight to be pushed, pulled, or wheeled onto the weight holding component (11). The ramp is connected by hinge (23) at the top, and the ramp control system (22). Ramp safety is provided for by locking device (34), again being a solenoid type, which would disallow movement of the vertical connection means until the desired time of the descent/ascent, allowing a safe amount of time for the loading/unloading of the stationary weight.

FIG. 2 shows the battery connector (25) going to the receiving connector (31) on the electric-powered vehicle, being forklift (32) in this illustration, allowing either for a quick-charge or a standard charge. When the static weight forklift is removed from the weight holding component (11) at the bottom of its travel, electricity generated while the weight holding device raises to its original position can be routed through the AC/DC convertor (28) to the facilities connector (29) or the power grid connector (30).

In reality, there could be a variety of these inventions used within the same facility, of different sizes, configurations, and power outputs, all within the scope of this patent, and having the same basic elements. The present invention aims to teach a new method, and does not mean to limit itself to the exact drawings or presentation here.

Utilizing this invention could even allow a battery storage system, through its own static weight, to become a source of creating electrical energy to replenish itself.

The invention claimed is:

1. A stationary weight electrical energy producing system comprising:
   a stationary weight holding component;
   a means for transitioning said stationary weight downward;
   a transmission system able to change linear motion of the holding component to rotation motion;
   an electric generator driven by the transmission system to generate an electrical power;
   a return means for returning said holding component to its original vertical position once the stationary weight is removed.

2. A system as in claim 1 having a clutch or otherwise free-spinning system to allow continued rotational motion even as linear motion is paused or stopped.

3. A system as in claim 1 having a flywheel means.

4. A system as in claim 1 having a connecting ramp/incline means.

5. A system as in claim 1 having a restraint on vertical movement while the static weight is loaded or unloaded from the stationary weight holding component.

6. A system as in claim 1 having a descent/ascent controlling means to allow timed or staged vertical movement downward or upward, thereby controlling power supplied to the generator.

7. A system as in claim 1 having a step-up transformer.

8. A system as in claim 1 having an AC/DC converter.

9. A system as in claim 1 having a means of storage of the generated electrical energy.

10. A system as in claim 1 having a mechanical guidance system allowing for smooth upward and downward movement of the stationary weight holding component.

11. A system as in claim 1 having an electric power output connection device to connect to electrical load facility system.

12. A system as in claim 1 that combines the function of the generator and flywheel into one unit.

* * * * *